US012371937B2

(12) United States Patent
Nghia et al.

(10) Patent No.: US 12,371,937 B2
(45) Date of Patent: Jul. 29, 2025

(54) HINGE AND DOOR

(71) Applicant: SUMITOMO ELECTRIC INDUSTRIES, LTD., Osaka (JP)

(72) Inventors: Duong Tuan Nghia, Komaki (JP); Hisahiko Narukawa, Komaki (JP); Shinsuke Sato, Komaki (JP); Takayuki Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 40 days.

(21) Appl. No.: 18/499,365

(22) Filed: Nov. 1, 2023

(65) Prior Publication Data

US 2024/0141708 A1 May 2, 2024

(30) Foreign Application Priority Data

Nov. 2, 2022 (JP) ................................. 2022-176147

(51) Int. Cl.
*E05D 15/50* (2006.01)

(52) U.S. Cl.
CPC ........ *E05D 15/505* (2013.01); *E05Y 2999/00* (2024.05)

(58) Field of Classification Search
CPC ....... E05D 15/505; E05D 1/02; E05D 7/1011; E05D 7/1022; E05D 7/1055; E05D 7/1077; E05D 5/12; E05D 2005/104; E05D 2005/108; E05Y 2999/00; E05Y 2800/676; F16F 3/0873
USPC ........................................................... 16/232
See application file for complete search history.

(56) References Cited

U.S. PATENT DOCUMENTS

| | | | | | |
|---|---|---|---|---|---|
| 413,298 | A * | 10/1889 | Kalb | E05D 15/505 | 16/232 |
| 505,480 | A * | 9/1893 | Pletcher | E05D 15/505 | 217/57 |
| 3,319,827 | A * | 5/1967 | Englesson | B65D 83/04 | 221/64 |
| 3,516,115 | A * | 6/1970 | Koleske | E05D 1/02 | 16/225 |
| 3,689,115 | A * | 9/1972 | Andreini | E05D 7/1055 | 292/87 |
| 4,014,438 | A * | 3/1977 | O'Toole | F16B 2/22 | 211/41.12 |
| 4,455,711 | A * | 6/1984 | Anderson | E05D 7/1011 | 16/229 |
| 4,570,290 | A * | 2/1986 | Anderson | E05D 7/1011 | 16/229 |
| 4,731,903 | A * | 3/1988 | Kennedy | E05D 7/1077 | 16/382 |
| 5,226,634 | A * | 7/1993 | Rudy, Jr. | H01R 13/6658 | 267/181 |

(Continued)

FOREIGN PATENT DOCUMENTS

JP H08-144619 A 6/1996

*Primary Examiner* — William L Miller
(74) *Attorney, Agent, or Firm* — Oliff PLC

(57) ABSTRACT

A hinge includes: a base portion extending in a first direction; a protruding portion having a projection projecting in the first direction; a spring portion configured to be elastically deformed in the first direction; and an operation portion. The base portion, the protruding portion, the spring portion, and the operation portion are made of a resin and integrally formed.

11 Claims, 11 Drawing Sheets

(56) References Cited

U.S. PATENT DOCUMENTS

| | | | | |
|---|---|---|---|---|
| 5,513,909 | A * | 5/1996 | Teich | E05D 5/023 312/351.6 |
| 5,641,086 | A * | 6/1997 | Sonntag | H02B 1/46 16/250 |
| 5,984,285 | A | 11/1999 | Konig et al. | |
| 2021/0198928 | A1* | 7/2021 | Patil | E05D 7/1005 |
| 2022/0010603 | A1* | 1/2022 | Karrasch | E05C 3/124 |
| 2024/0092271 | A1* | 3/2024 | Kwon | B60R 5/045 |

* cited by examiner

HINGE AND DOOR

TECHNICAL FIELD

The present disclosure relates to a hinge and a door. This application claims priority from Japanese Patent Application No. 2022-176147 filed on Nov. 2, 2022, the entire contents of which are incorporated herein by reference.

JPH08-144619A discloses a pivot hinge including a holder fixed to a door, a shaft rod vertically movably inserted into a shaft hole of an upper plate portion and a shaft hole of a lower plate portion of the holder, a spring urging the shaft rod downward, and an operation rod protruding from a side surface of the shaft rod in order to easily attach and detach the door. A side plate portion of the holder is provided with a positioning hole in an up-down direction and a locking hole intersecting an upper end of the positioning hole in a transverse direction. When the operation rod is engaged with the positioning hole, the shaft rod is inserted into a shaft hole of a fixed frame of the door, and when the operation rod is engaged with the locking hole, the shaft rod is held in a state of being disengaged from the shaft hole of the fixed frame.

U.S. Pat. No. 5,984,285B discloses a resin spring including a spring support portion, a web supported by the spring support portion, a first spring plate attached to the web, and at least one auxiliary spring plate provided between the first spring plate and the spring support portion and extending from the web. The first spring plate and the at least one auxiliary spring plate are parallel to each other, and the resin spring reinforces strength and an elastic force of the first spring plate by the auxiliary spring plate.

SUMMARY

A hinge of the present disclosure includes:

a base portion extending in a first direction;

a protruding portion having a projection projecting in the first direction;

a spring portion configured to be elastically deformed in the first direction; and an operation portion, in which the base portion, the protruding portion, the spring portion, and the operation portion are made of a resin and integrally formed.

DESCRIPTION OF EMBODIMENTS

Figure 1:
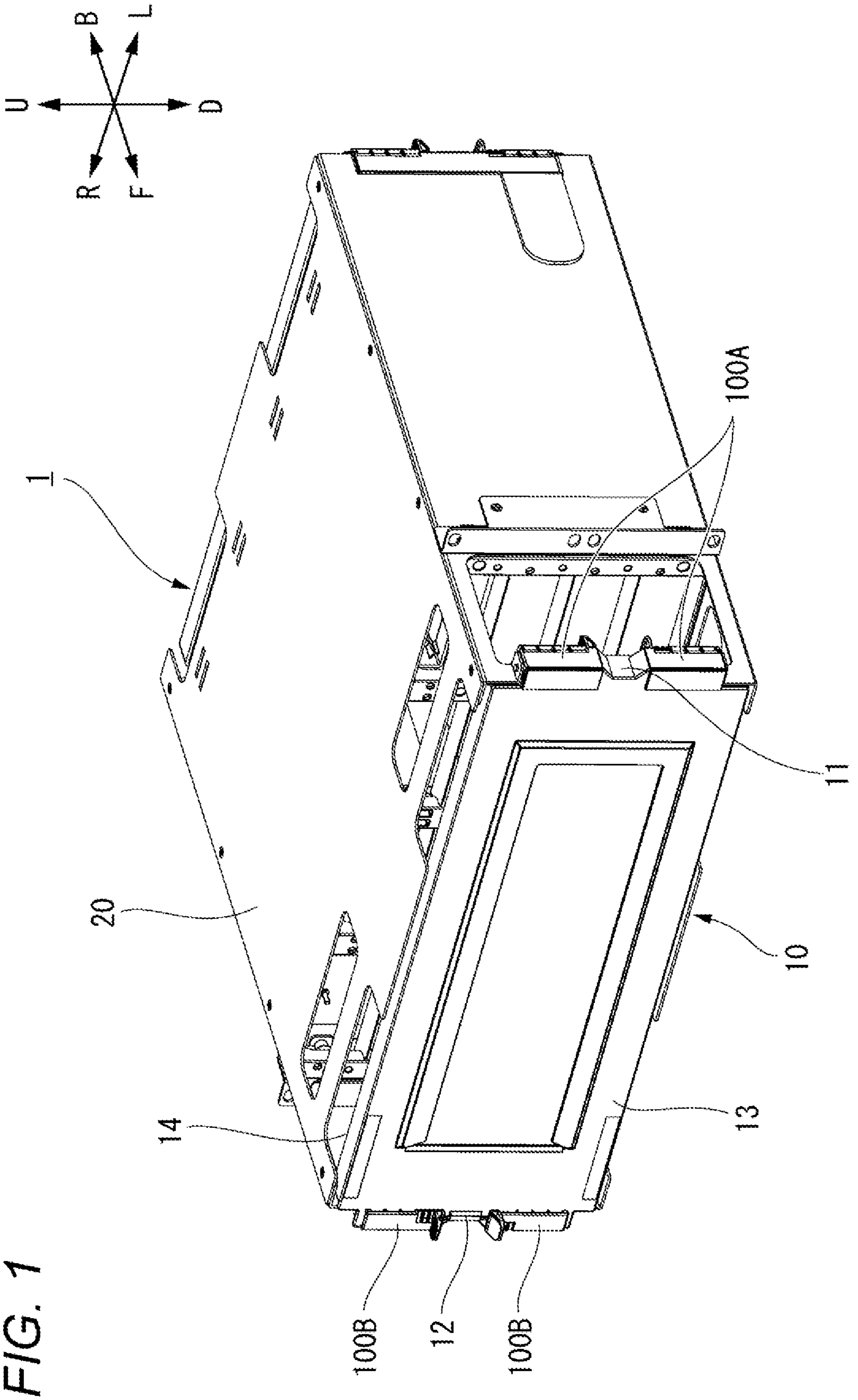
FIG. 1 is a perspective view of an optical connection box according to an embodiment of the present disclosure.

Since the pivot hinge disclosed in JPH08-144619A is implemented by combining a plurality of components, a manufacturing cost is high. Since the spring is a compression coil spring, it is difficult to integrally form the spring with other components.

An object of the present disclosure is to provide a hinge that is inexpensive and has a simple structure, and a door to which the hinge is attached.

According to the present disclosure, it is possible to provide a hinge that is inexpensive and has a simple structure, and a door to which the hinge is attached.

DESCRIPTION OF EMBODIMENT OF PRESENT DISCLOSURE

First, embodiments of the present disclosure will be listed and described.

(1) A hinge according to an aspect of the present disclosure includes:

a base portion extending in a first direction;

a protruding portion protruding from a first surface of the base portion and having a projection projecting in the first direction;

a spring portion protruding from the first surface, having at least one bent portion, and configured to be elastically deformed in the first direction; and an operation portion provided on a second surface of the base portion and configured to be operated along the first direction, in which the base portion, the protruding portion, the spring portion, and the operation portion are made of a resin and integrally formed.

According to the present disclosure, the hinge includes the base portion extending in the first direction, the protruding portion having the projection projecting in the first direction, the spring portion configured to be elastically deformed in the first direction, and the operation portion. When the operation portion is operated along the first direction in a state where the projection of the hinge is engaged with an engaged object such as an optical connection box, the spring portion is elastically deformed along the first direction and the projection of the hinge is disengaged from the engaged object, and thus the door to which the hinge is attached can be easily disengaged from the engaged object. Further, since the base portion, the protruding portion, the spring portion, and the operation portion are made of a resin and are integrally formed, it is not necessary to assemble a plurality of components, and the hinge having a simple structure can be manufactured at a relatively low cost.

(2) The hinge according to the above (1) may further include: a side plate portion protruding from the first surface and extending in the first direction between the protruding portion and the spring portion.

According to the present disclosure, since the hinge includes the side plate portion protruding from the first surface and extending in the first direction between the protruding portion and the spring portion, strength of the entire hinge can be reinforced. In the state where the hinge is engaged with the engaged object such as a door, the hinge can be stably guided along the engaged object by sliding the side plate portion on a part of the engaged object.

(3) In the above (1) or (2), the spring portion may include a first spring portion protruding from the first surface, a second spring portion formed from the first spring portion toward the first surface via the bent portion, and a first rib connecting the first spring portion to the second spring portion at the bent portion.

According to the present disclosure, since the spring portion has the first rib connecting the first spring portion to the second spring portion at the bent portion, it is possible to reduce load of the bent portion when the spring portion is compressed, and to reduce deflection.

(4) In any one of the above (1) to (3), the projection may have a pin shape.

According to the present disclosure, since the projection has the pin shape, the pin can be engaged with the engaged object such as an optical connection box.

(5) In any one of the above (1) to (3), the projection may be a latch.

According to the present disclosure, since the projection is the latch, the latch can be engaged with the engaged object such as a door.

(6) A door according to another aspect of the present disclosure is a door of an optical connection box of an optical cable, the door including:

at least one hinge according to any one of the above (1) to (5), in which the spring portion may be configured to urge the hinge in the first direction with respect to the door, and the projection may be attached to and detached from the door by moving the operation portion in the first direction.

According to the present disclosure, since the door has at least one hinge, it is possible to easily attach the door to and detach the door from the optical connection box without screwing or welding.

(7) A door according to another aspect of the present disclosure is a door of an optical connection box of an optical cable, in which the door may have a first side and a second side facing each other, at least one hinge according to the above (4), which is a first hinge, may be provided on the first side, the spring portion of the first hinge may be configured to urge the first hinge in the first direction with respect to the door on the first side, the projection of the first hinge may be attached to and detached from the door by moving the operation portion of the first hinge in the first direction on the first side, at least one hinge according to the above (5), which is a second hinge, may be provided on the second side, the spring portion of the second hinge may be configured to urge the second hinge in the first direction with respect to the door on the second side, the projection of the second hinge may be attached to and detached from the door by moving the operation portion of the second hinge in the first direction on the second side, the operation portion of the first hinge may protrude from a first surface of the door, and the operation portion of the second hinge may protrude from a second surface of the door.

According to the present disclosure, since the operation portion of the first hinge protrudes from the first surface of the door, and the operation portion of the second hinge protrudes from the second surface of the door, the door can be easily attached to and detached from either the first surface or the second surface of the door.

(8) In the above (6), the spring portion may have a second rib protruding from the bent portion in the first direction, the second rib may be configured to abut on a part of the door when the hinge slides with respect to the door, and a distance between the second rib in a steady state and the part of the door may be 0.4 times or more and 0.6 times or less of a slide stroke of the hinge sliding with respect to the door in the first direction.

According to the present disclosure, since the spring portion has the second rib protruding from the bent portion in the first direction, when the spring portion is compressed, the second rib comes into contact with the part of the door, thereby preventing excessive deformation of the spring portion. Further, since the distance between the second rib in the steady state and a part of the door is 0.4 times or more and 0.6 times or less of the slide stroke of the hinge sliding in the first direction with respect to the door, the entire spring portion can be deformed relatively uniformly, so that local deformation can be further prevented.

(9) In the above (7), the spring portion may have a second rib protruding from the bent portion in the first direction on at least one of the first hinge and the second hinge, the second rib may be configured to abut on a part of the door when the hinge slides with respect to the door, and a distance between the second rib in a steady state and the part of the door may be 0.4 times or more and 0.6 times or less of a slide stroke of the hinge sliding with respect to the door in the first direction.

According to the present disclosure, since the spring portion has the second rib protruding from the bent portion in the first direction, when the spring portion is compressed, the second rib comes into contact with the part of the door, thereby preventing excessive deformation of the spring portion. Further, since the distance between the second rib in the steady state and a part of the door is 0.4 times or more and 0.6 times or less of the slide stroke of the hinge sliding in the first direction with respect to the door, the entire spring portion can be deformed relatively uniformly, so that local deformation can be further prevented.

DETAILS OF EMBODIMENT OF PRESENT DISCLOSURE

A specific example of an optical connection box 1 for optical cables according to an embodiment of the present disclosure will be described with reference to the drawings. An "up-down direction", a "left-right direction", and a "front-back direction" in the present embodiment are relative directions set for the optical connection box 1 illustrated in FIG. 1 for convenience of description. The present disclosure is not limited to these exemplifications, but is indicated by the scope of claims, and is intended to include all changes within a scope and meaning equivalent to the scope of claims.

Configuration of Optical Connection Box of Optical Cable

Figure 2:
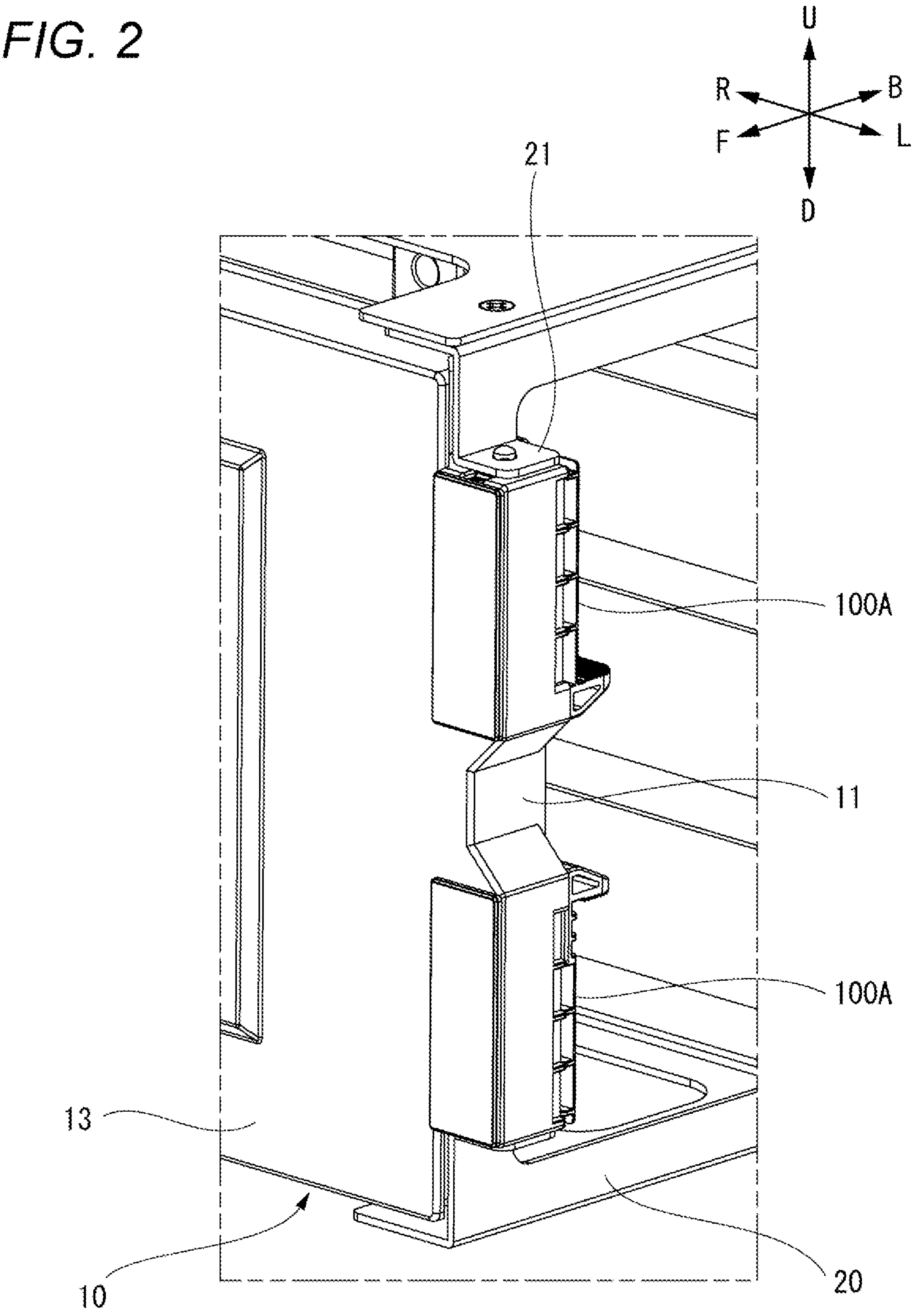
FIG. 2 is a partially enlarged view of a door and first hinges in the optical connection box of FIG. 1.
Figure 3:
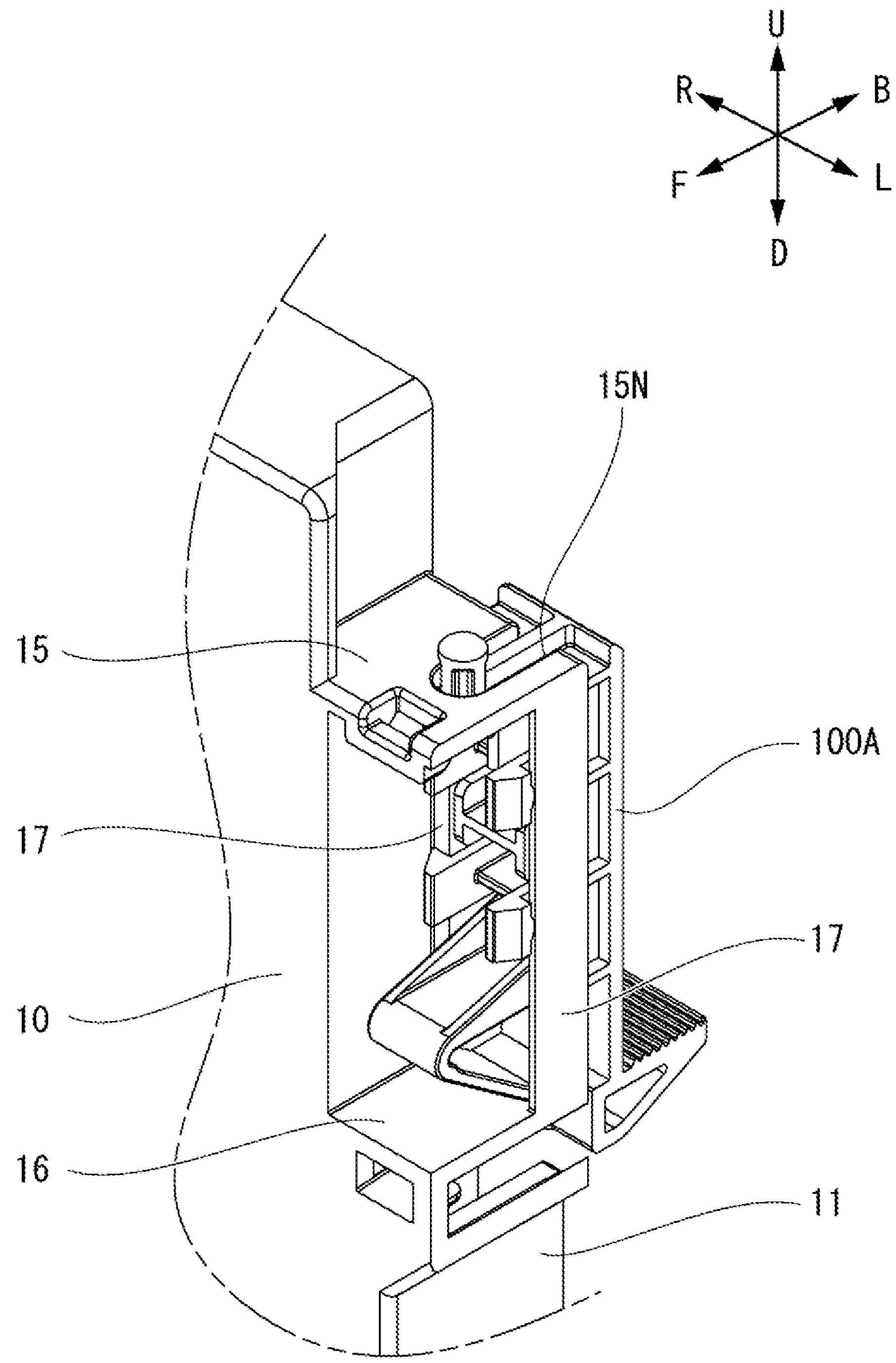
FIG. 3 is a perspective view illustrating a state in which the first hinge is engaged with the door.

FIG. 1 is a perspective view of the optical connection box 1 according to the embodiment of the present disclosure. FIG. 2 is a partially enlarged view of a door 10 and first hinges 100A in the optical connection box 1 of FIG. 1. FIG. 3 is a perspective view illustrating a state in which the first hinge 100A is engaged with the door 10.

The up-down direction of the present embodiment is a height direction of the optical connection box 1. In each drawing, "U" indicates an upward side, and "D" indicates a downward side. The front-back direction of the present embodiment is perpendicular to the up-down direction, and a direction in which the door 10 is provided is defined as a front side, and a direction from the door 10 to the inside of the optical connection box 1 is defined as a back side. In each drawing, "F" indicates the front, and "B" indicates the back. The left-right direction of the present embodiment is a direction perpendicular to both the up-down direction and the front-back direction, and is a width direction of the optical connection box 1. In each drawing, "L" indicates a left side, and "R" indicates a right side. The up-down direction is an example of a first direction.

As illustrated in FIG. 1, the optical connection box 1 of the present embodiment has a rectangular parallelepiped shape. Inside the optical connection box 1, each of the plurality of optical cables may be connected to another optical cable. The optical connection box 1 includes the door 10 provided on the front side and a main body 20 provided on the back side. The door includes first hinges 100A and second hinges 100B. The first hinge 100A and the second hinge 100B are both examples of a hinge.

As illustrated in FIG. 1, the door 10 has a rectangular shape. The door 10 has a first side 11 and a second side 12. The first side 11 and the second side 12 face each other. In the present embodiment, the first side 11 extends in the up-down direction and is located on a left side of the door 10. The second side 12 extends in the up-down direction and is located on a right side of the door 10. At least one first hinge 100A is provided on the first side 11 of the door 10. In the present embodiment, two first hinges 100A are provided on the first side 11. The second side 12 is provided with at least one second hinge 100B. In the present embodiment, two second hinges 100B are provided on the second side 12.

The door 10 further includes a front surface 13 and a rear surface 14. In the present embodiment, the front surface 13 is a surface perpendicular to the front-back direction, and is located in the front of the door 10. The rear surface 14 is a surface perpendicular to the front-back direction and is located on a back side of the door 10. The front surface 13 is provided on an opposite side of the rear surface 14. The rear surface 14 is an example of a first surface of the door 10. The front surface 13 is an example of a second surface of the door 10.

As illustrated in FIG. 2, the door 10 is attached to attachment surfaces 21 of the main body 20 via the first hinges 100A. The attachment surface 21 of the present embodiment is located on a front left side of the main body 20 and has a surface perpendicular to the up-down direction. As illustrated in FIG. 3, the first hinge 100A is configured to be engaged with the door 10 at the first side 11 of the door 10. An engagement configuration between the first hinge 100A and the door 10 will be described later.

Similarly, the door 10 is attached to the main body 20 via the second hinges 100B (FIG. 1). The second hinge 100B is configured to be engaged with the door 10 at the second side 12 of the door 10.

Configuration of First Hinge

Figure 4:
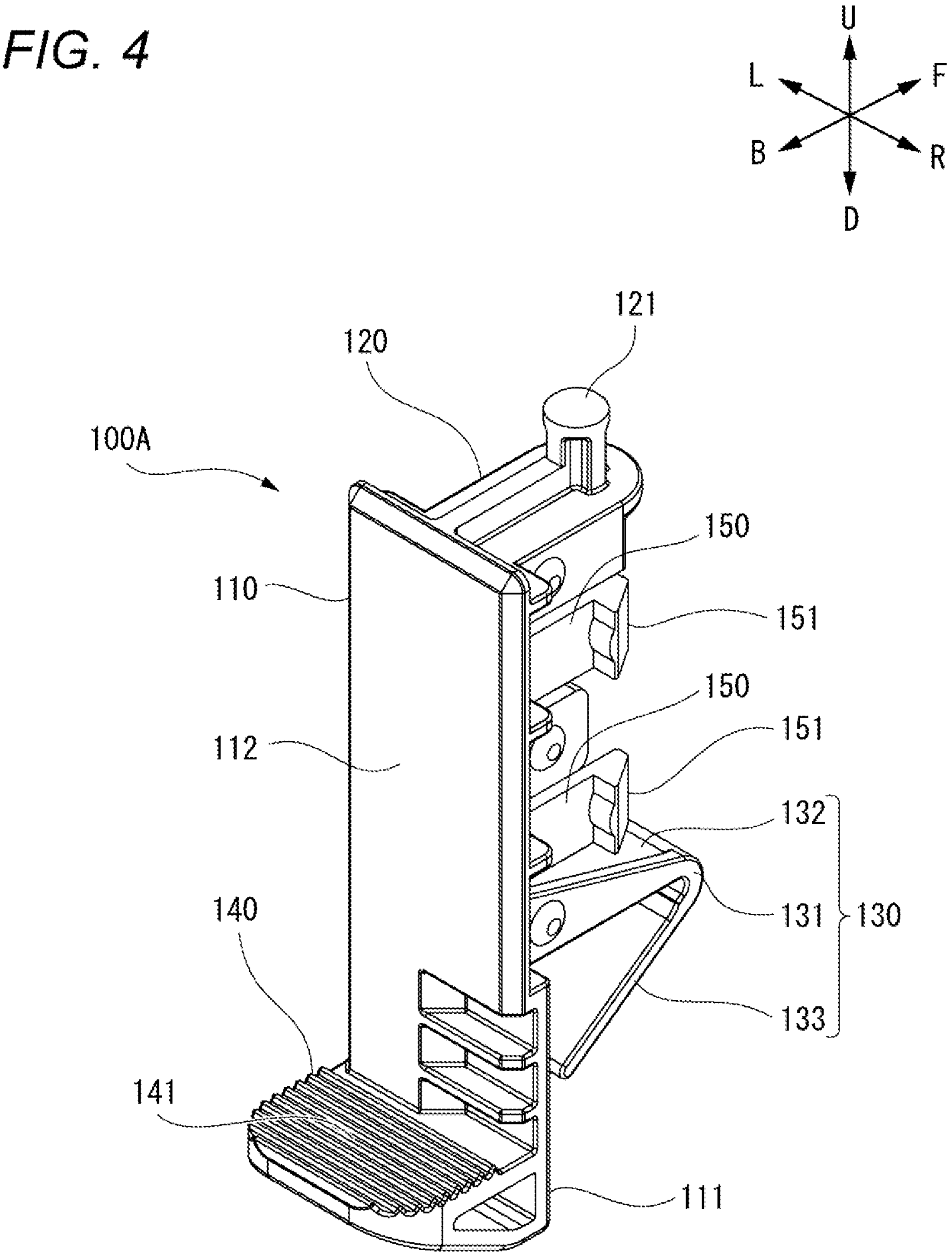
FIG. 4 is a perspective view of the first hinge.
Figure 5:
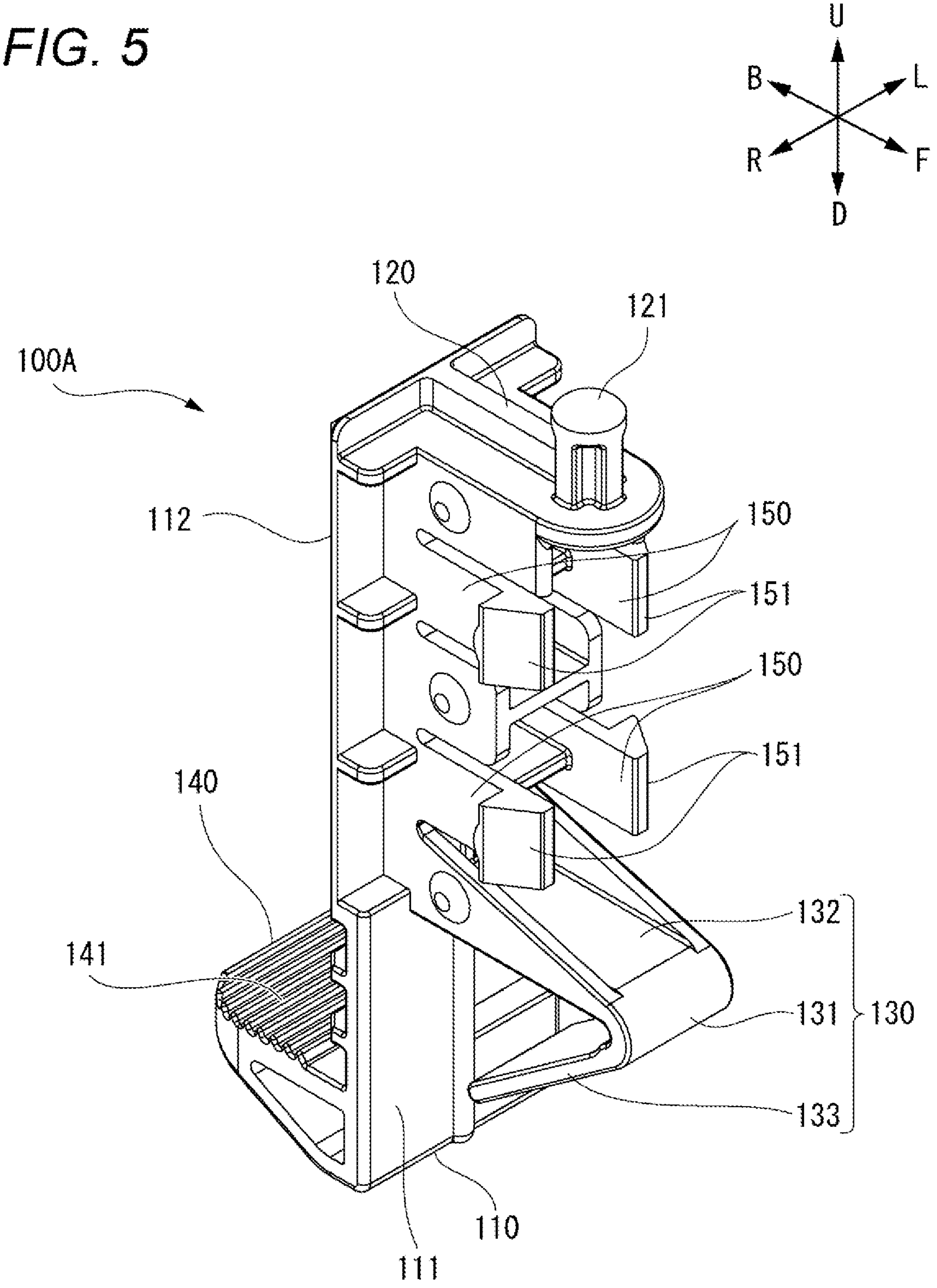
FIG. 5 is another perspective view of the first hinge.

Next, the first hinge 100A will be described in detail. FIGS. 4 and 5 are perspective views of the first hinge 100A. The following description will be made based on the up-down direction, the front-back direction, and the left-right direction when the first hinge 100A illustrated in FIGS. 4 and 5 is attached to an upper left side of the door 10. As illustrated in FIGS. 4 and 5, the first hinge 100A includes a base portion 110, a protruding portion 120, a spring portion 130, and an operation portion 140. The base portion 110, the protruding portion 120, the spring portion 130, and the operation portion 140 are made of a resin and are integrally formed. The first hinge 100A may further include side plate portions 150. The side plate portion 150 may also be made of a resin and be formed integrally with the base portion 110.

The base portion 110 extends in the up-down direction and has a rectangular shape. The base portion 110 has a front surface 111 and a rear surface 112. The front surface 111 is provided on the opposite side of the rear surface 112. The front surface 111 and the rear surface 112 have flat surfaces substantially perpendicular to the front-back direction. The front surface 111 is an example of a first surface of the base portion 110. The rear surface 112 is an example of a second surface of the base portion 110.

The protruding portion 120 protrudes from the front surface 111 of the base portion 110 and has a projection 121 projects in the up-down direction. The protruding portion 120 of the present embodiment is provided on an upper portion of the front surface 111. The projection 121 projects upward from the protruding portion 120. Further, the projection 121 has a pin shape. The projection 121 has, for example, a columnar shape. Since the projection 121 has the pin shape, the first hinge 100A of the present embodiment functions as a pivot hinge.

The spring portion 130 protrudes from the front surface 111 of the base portion 110 and has at least one bent portion 131. Further, the spring portion 130 is configured to be elastically deformed in the up-down direction.

Figure 6:
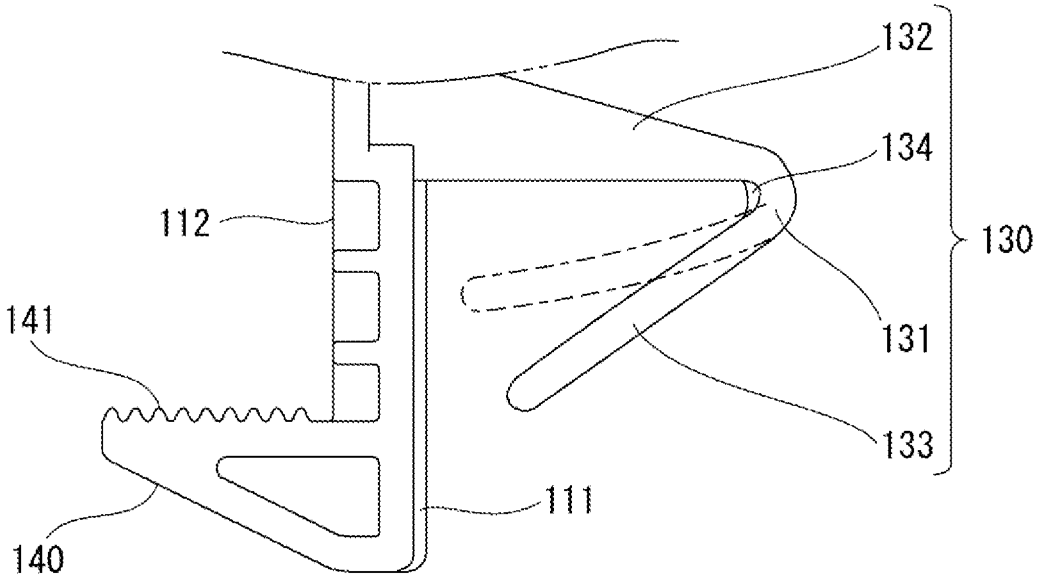
FIG. 6 is a partially enlarged view of a spring portion of the first hinge.

FIG. 6 is a partially enlarged view of the first hinge 100A. FIG. 6 mainly illustrates the spring portion 130 and the operation portion 140. As illustrated in FIG. 6, the spring portion 130 includes a first spring portion 132, a second spring portion 133, and a first rib 134 in addition to the bent portion 131. The first spring portion 132 protrudes from the front surface 111 of the base portion 110. The second spring portion 133 is formed from the first spring portion 132 toward the front surface 111 via the bent portion 131. The first rib 134 is formed to connect the first spring portion 132 and the second spring portion 133 at the bent portion 131.

Referring back to FIGS. 4 and 5, the description of each component of the first hinge 100A will be continued. The operation portion 140 is provided on the rear surface 112 of the base portion 110 and is configured to be operated along the up-down direction. The operation portion 140 of the present embodiment is provided at a lower portion of the rear surface 112. The operation portion 140 is a knob having an operation surface 141 substantially perpendicular to the rear surface 112. The operation surface 141 of the present embodiment faces upward. For example, a plurality of grooves may be formed in the operation surface 141. The operation portion 140 includes an operation surface 141 facing upward, and is configured to be operated downward by pressing the operation surface 141 from above.

The side plate portion 150 protrudes from the front surface 111 of the base portion 110 between the protruding portion 120 and the spring portion 130 and extends in the up-down direction. In the present embodiment, two pairs of side plate portions 150, that is, a total of four side plate portions 150 are provided in the left-right direction from the front surface 111. Each side plate portion 150 extends substantially perpendicularly from the front surface 111 in the front-back direction. Each of the side plate portions 150 may be provided with a claw portion 151 configured to be engaged with the door 10.

Configuration of Second Hinge

Figure 7:
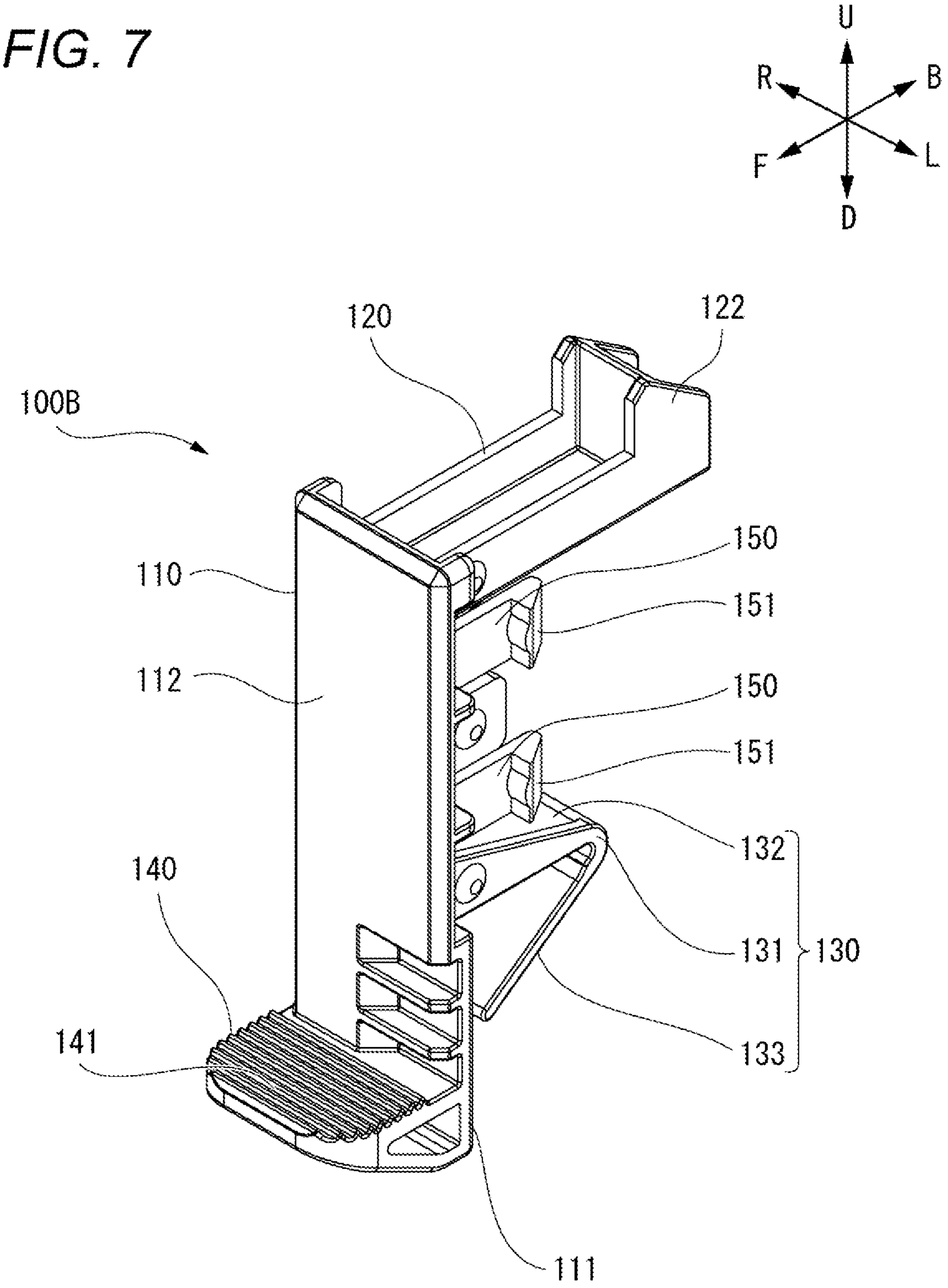
FIG. 7 is a perspective view of a second hinge.
Figure 8:
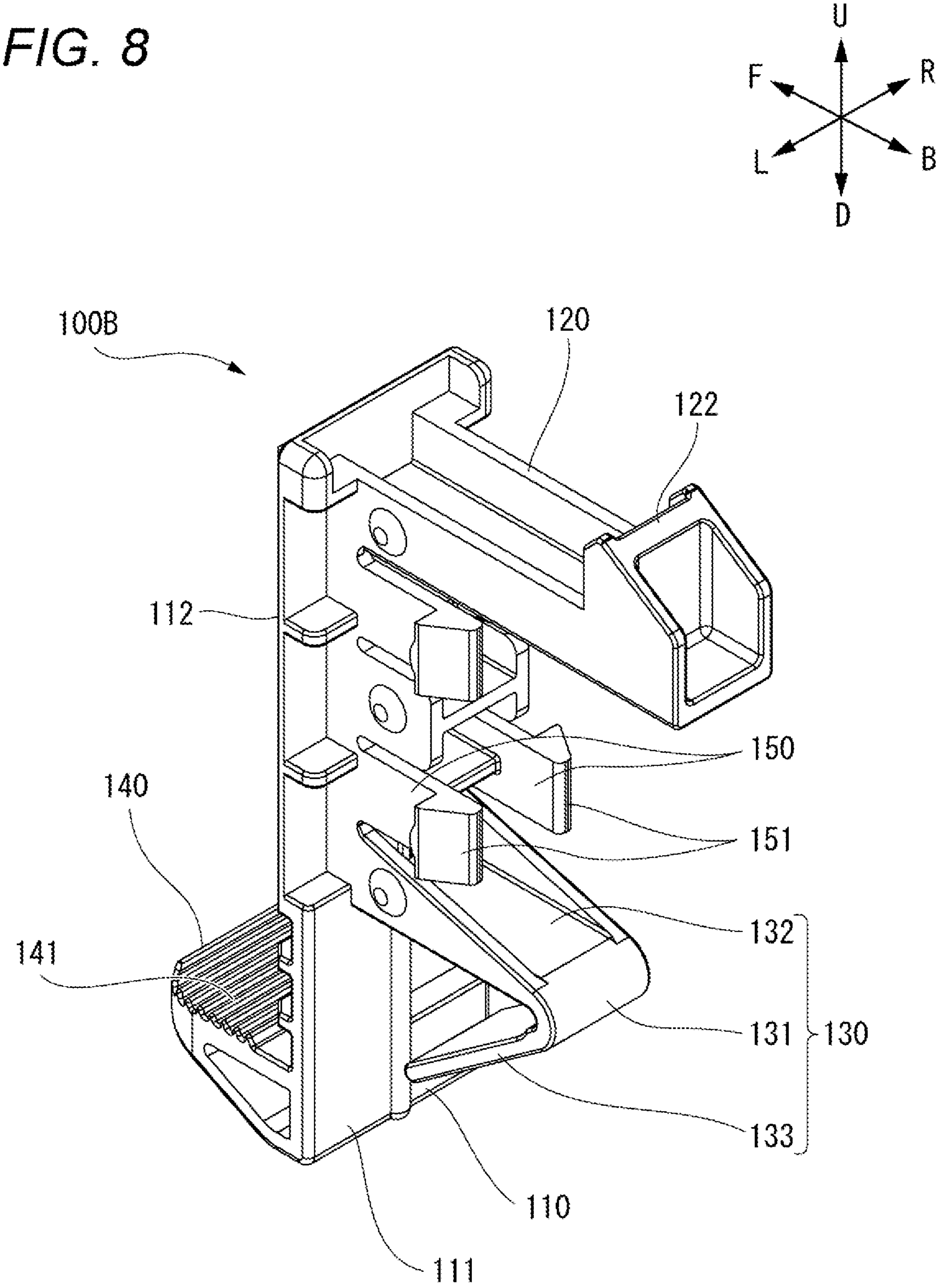
FIG. 8 is another perspective view of the second hinge.

Next, the second hinge 100B will be described in detail. FIGS. 7 and 8 are perspective views of the second hinge 100B. The following description will be made based on the up-down direction, the front-back direction, and the left-right direction when the second hinge 100B illustrated in FIGS. 7 and 8 is attached to an upper right side of the door 10. In the configurations illustrated in FIGS. 7 and 8, the same components as those illustrated in FIGS. 4 and 5 are denoted by the same reference numerals, and descriptions thereof are omitted.

As illustrated in FIGS. 4 and 5, the protruding portion 120 of the first hinge 100A has a pin shaped projection 121. As illustrated in FIGS. 7 and 8, the protruding portion 120 of the second hinge 100B includes a latch 122. The latch 122 has a wide shape in the left-right direction and protrudes upward from the protruding portion 120. The latch 122 is also made of a resin, and is integrally formed with the base portion 110, the spring portion 130, and the like. Since the protruding portion 120 includes the latch 122, the second hinge 100B of the present embodiment functions as a lock latch.

Use of First Hinge

Next, attachment and detachment of the first hinges 100A to and from the main body of the optical connection box 1 will be described with reference to FIGS. 1,2, 3, and 6. Here, attachment and detachment of the first hinge 100A attached to the upper left side of the door 10 will be described as an example. Attachment and detachment of the first hinge 100A attached to a left lower side of the door 10 are the same as the attachment and detachment of the first hinge 100A attached to the upper left side of the door 10 except that an operation direction is vertically reversed, and thus description thereof will be omitted. Similarly, the attachment and detachment of the two second hinges 100B attached to the right side of the door 10 are the same as the attachment and detachment of the first hinges 100A except for the operation direction and attachment positions, and thus the description thereof will be omitted.

As illustrated in FIG. 1, the door 10 is configured to be attached to the main body 20 via the two first hinges 100A and the two second hinges 100B. At this time, the operation portion 140 of each first hinge 100A protrudes from the rear surface 14 of the door 10. The operation portion 140 of each second hinge 100B protrudes from the front surface 13 of the door 10.

In the present embodiment, a state in which the first hinge 100A is engaged with the door 10 is referred to as a steady state of the first hinge 100A. The steady state is also a state in which the door 10 is attached to the main body 20 via the first hinge 100A. As illustrated in FIG. 3, in the steady state, the projection 121 of the protruding portion 120 is engaged with an attachment surface 15 of the door 10. The attachment surface 15 has notches 15N provided in a surface perpendicular to the up-down direction in the first side 11 of the door 10. The projection 121 passes through the notch 15N and is engaged with the attachment surface 21 of the main body 20 (FIG. 2). Since the pin shaped projection 121 is engaged with the attachment surface 21 of the main body 20, the door 10 is attached to the main body 20 so as to be rotatable about the projection 121 as a central axis in the steady state. The second hinge 100B including the latch 122 is also configured to be engaged with the attachment surface 21 of the main body 20. However, since the second hinge 100B is a lock latch, the door 10 is attached so as not to rotate about the main body 20 in the steady state.

When the first hinge 100A is in the steady state, the second spring portion 133 of the spring portion 130 may or may not be in contact with a contact surface 16 of the door 10. The contact surface 16 has a surface substantially perpendicular to the up-down direction on the first side 11 of the door 10. The contact surface 16 is an example of a part of the door 10. In the present embodiment, the second spring portion 133 is in contact with the contact surface 16 by the weight of the first hinge 100A. At this time, the spring portion 130 may or may not urge the first hinge 100A upward. When the first hinge 100A is provided on the lower left side of the door 10, the second spring portion 133 may not be in contact with the contact surface 16 due to the weight of the first hinge 100A. Even in such a case, the projection 121 of the protruding portion 120 has a sufficient length in the up-down direction so as to be engaged with the attachment surface 21 of the main body 20. The side plate portion 150 is in contact with a side surface 17 of the door 10. The side surface 17 extends in the up-down direction on the first side 11 of the door 10. The claw portion 151 is engaged with the side surface 17 of the door 10.

When the door 10 is removed from the main body 20 by using the first hinge 100A in the steady state, a user places a finger on the operation surface 141 of the operation portion 140 of the first hinge 100A. When the operation portion 140 is pressed by the finger of the user and moves downward, the first hinge 100A starts to be urged upward with respect to the door by the spring portion 130. Further, the first hinge 100A is urged by the spring portion 130 in advance in the steady state. When a plurality of grooves are formed in the operation surface 141, the grooves may function as a slip stopper. The user moves the first hinge 100A downward against the biasing force of the spring portion 130 while putting the finger on the operation surface 141. At this time, the spring portion 130 contracts downward toward the contact surface 16 of the door 10 and is elastically deformed. As illustrated in FIG. 6, a part (for example, the second spring portion 133) of the spring portion 130 may be elastically deformed, or a plurality of portions (for example, the bent portion 131, the first spring portion 132, and the second spring portion 133) of the spring portion 130 may be elastically deformed. At this time, since the first rib 134 is formed to connect the first spring portion 132 to the second spring portion 133, it is possible to reduce a load on the bent portion 131 located between the first spring portion 132 and the second spring portion 133.

When the spring portion 130 is elastically deformed, the side plate portion 150 slides on the side surface 17 of the door 10, and the entire first hinge 100A slides downward with respect to the main body 20. As a result, the projection 121 of the protruding portion 120 is disengaged from the attachment surface 21 of the main body 20, and the door 10 is detached from the main body 20. Further, when the first hinge 100A slides downward, the projection 121 may be disengaged from the notch 15N of the attachment surface 15, but since the claw portion 151 of the side plate portion 150 is engaged with the side surface 17, the first hinge 100A can be prevented from falling off the door 10.

As described above, in the first hinge 100A of the present embodiment, when the operation portion 140 is operated downward from the steady state in which the projection 121 of the protruding portion 120 is engaged with the attachment surface 21 of the optical connection box 1, the spring portion 130 is elastically deformed in the up-down direction, and the projection 121 is disengaged from the attachment surface 21. Thus, the door 10 to which the first hinge 100A is attached can be easily detached from the main body 20. Further, in the first hinge 100A, the base portion 110, the protruding portion 120, the spring portion 130, and the operation portion 140 are made of a resin and are integrally formed. Therefore, it is not necessary to assemble a plurality of components, and it is possible to implement the first hinge 100A that is inexpensive and has a simple structure compared to a case where the plurality of components are not integrally formed.

Since the first hinge 100A includes the side plate portion 150 extending in the up-down direction, strength of the entire first hinge 100A is reinforced. When the operation portion 140 is further operated downward, the side plate portion 150 slides on the side surface 17 of the door 10. Therefore, the first hinge 100A can be stably guided in the up-down direction along the side surface 17.

The spring portion 130 has the first rib 134 that connects the first spring portion 132 to the second spring portion 133 at the bent portion 131. Therefore, it is possible to reduce the load of the bent portion 131 when the spring portion 130 is further contracted by the elastic deformation, and to reduce the deflection.

Effects similar to those described in the first hinge 100A may be exerted in the second hinge 100B.

Since the projection 121 of the protruding portion 120 of the first hinge 100A has the pin shape, the projection 121 can be engaged with the attachment surface 21 of the main body in the optical connection box 1. Accordingly, the door 10 can be easily attached to and detached from the main body 20 via the first hinge 100A.

Since the protruding portion 120 of the second hinge 100B includes the latch 122, the door 10 can be easily attached to and detached from the main body 20 via the second hinge 100B.

At least one first hinge 100A is provided on the first side 11 of the door 10, and at least one second hinge 100B is provided on the second side 12. Therefore, it is not necessary to screw or weld the door 10 to the optical connection box 1. When the operation portion 140 of the second hinge 100B provided on the second side 12 is operated to remove the latch 122 from the attachment surface 21 of the main body 20 in a state where the first hinge 100A provided on the first side 11 is engaged with the attachment surface 21 of the main body 20, the door 10 can be opened and closed with respect to the main body 20 around the projection 121 of the first hinge 100A. When the door 10 is removed from the main body 20, the projection 121 and the latch 122 may be removed from the attachment surface 21 by operating the operation portion 140 of each of the first hinge 100A provided on the first side 11 and the second hinge 100B provided on the second side 12. With such a configuration, the door 10 can be opened and closed or attached to and detached from the main body 20 of the optical connection box 1.

The operation portion 140 of the first hinge 100A provided on the first side 11 protrudes from the rear surface 14 of the door 10, and the operation portion 140 of the second hinge 100B provided on the second side 12 protrudes from the front surface 13 of the door 10. Therefore, the user can easily attach and detach the door 10 from either the front surface 13 or the rear surface 14 of the door 10 via the first hinge 100A or the second hinge 100B.

Modification of Hinge

Figure 9:
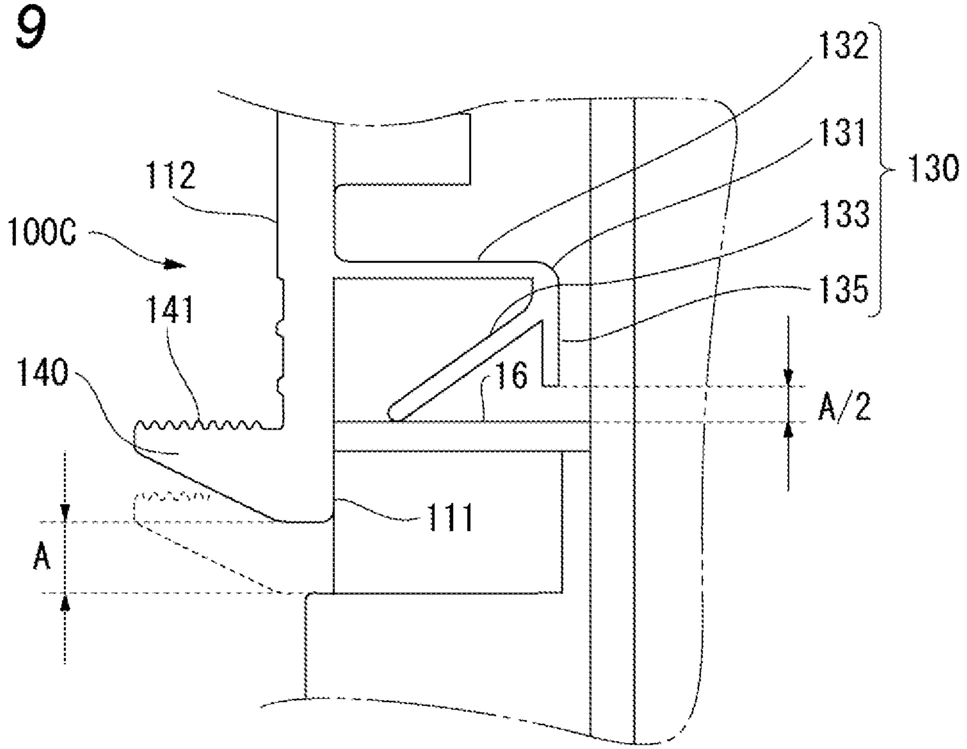
FIG. 9 is a partially enlarged schematic view of a modification of a hinge.
Figure 10:
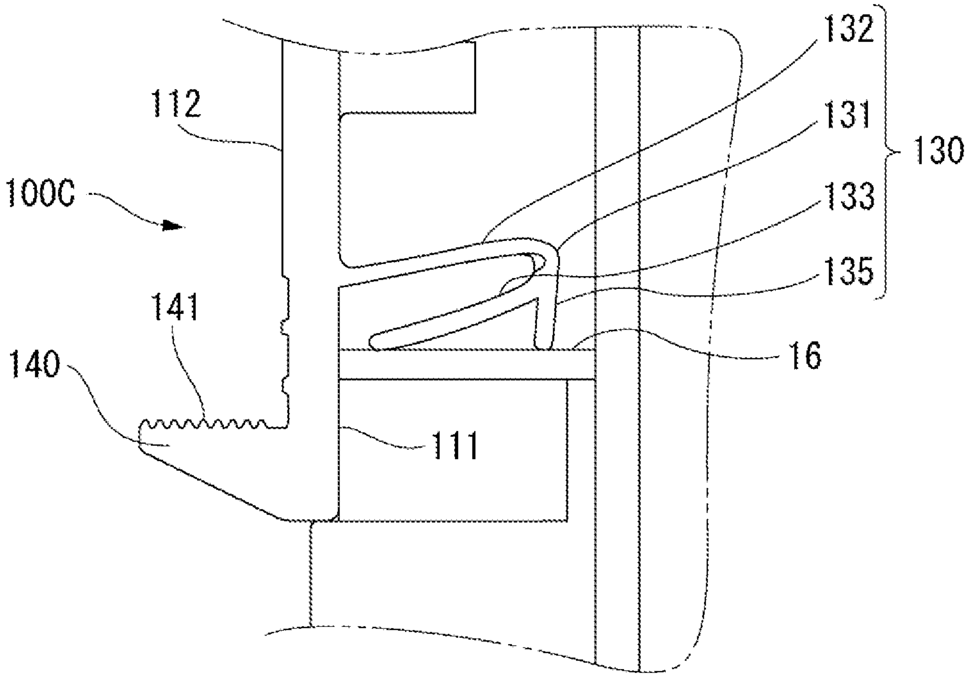
FIG. 10 is a partially enlarged schematic view of the modification of the hinge illustrating a state in which a spring portion of FIG. 9 is elastically deformed.

FIGS. 9 and 10 are partially enlarged schematic views of a third hinge 100C as a modification of the hinge. FIGS. 9 and 10 mainly illustrate the spring portion 130 and the operation portion 140 of the third hinge 100C. In the configurations illustrated in FIGS. 9 and 10, the same components as those illustrated in FIGS. 4 and 5 are denoted by the same reference numerals, and descriptions thereof are omitted.

As illustrated in FIGS. 9 and 10, the spring portion 130 of the third hinge 100C includes a second rib 135 protruding in the up-down direction from the bent portion 131. In the present embodiment, the second rib 135 protrudes downward from the bent portion 131 toward the contact surface 16 of the door 10. The second rib 135 is also made of a resin, and is integrally formed with another configuration of the third hinge 100C. As illustrated in FIG. 9, in the steady state, the second rib 135 is not in contact with the contact surface 16 and is separated from the contact surface 16.

As illustrated in FIG. 10, when the operation portion 140 of the third hinge 100C is operated in the up-down direction and the third hinge 100C slides downward with respect to the door 10, the second rib 135 is configured to abut on the contact surface 16 of the door 10. More specifically, when the operation portion 140 moves downward by a slide stroke A, a distance between the second rib 135 and the contact surface 16 becomes zero. At this time, the bent portion 131, the first spring portion 132, and the second spring portion 133 of the spring portion 130 are elastically deformed. On the other hand, since the second rib 135 extends downward from the bent portion 131 and substantially parallel to the direction in which the operation portion 140 is operated, the second rib 135 is not elastically deformed as compared with other portions of the spring portion 130. Therefore, after the second rib 135 comes into contact with the contact surface 16, the third hinge 100C is suppressed from further sliding downward with respect to the door 10.

The second rib 135 is provided such that the distance between the second rib 135 in the steady state and the contact surface 16 is 0.4 times or more and 0.6 times or less the slide stroke A. In the present embodiment, the distance between the second rib 135 in the steady state and the contact surface 16 is 0.5 times the slide stroke A. The distance between the second rib 135 in the steady state and the contact surface 16 or a length of the second rib 135 protruding downward from the bent portion 131 may be set such that the first spring portion 132 and the second spring portion 133 are elastically deformed to the same extent when the operation portion 140 moves downward by the slide stroke A.

As described above, the spring portion 130 of the third hinge 100C includes the second rib 135 protruding downward from the bent portion 131. When the operation portion 140 is operated downward by a predetermined length, the second rib 135 comes into contact with the contact surface 16 of the door 10. Therefore, excessive deformation of the spring portion 130 can be prevented. The distance between the second rib 135 in the steady state and the contact surface 16 of the door 10 is 0.4 times or more and 0.6 times or less the slide stroke A of the third hinge 100C sliding in the up-down direction with respect to the door 10. Therefore, since the entire spring portion 130 can be deformed relatively uniformly, local deformation can be further prevented.

Although the present disclosure has been described in detail and with reference to the specific embodiments, it is apparent to those skilled in the art that various changes and modifications can be made without departing from the spirit and scope of the present disclosure. Further, the number, positions, shapes, and the like of the constituent members described above are not limited to the embodiments described above, and can be changed to the number, positions, shapes, and the like suitable for carrying out the present disclosure.

Figure 11:
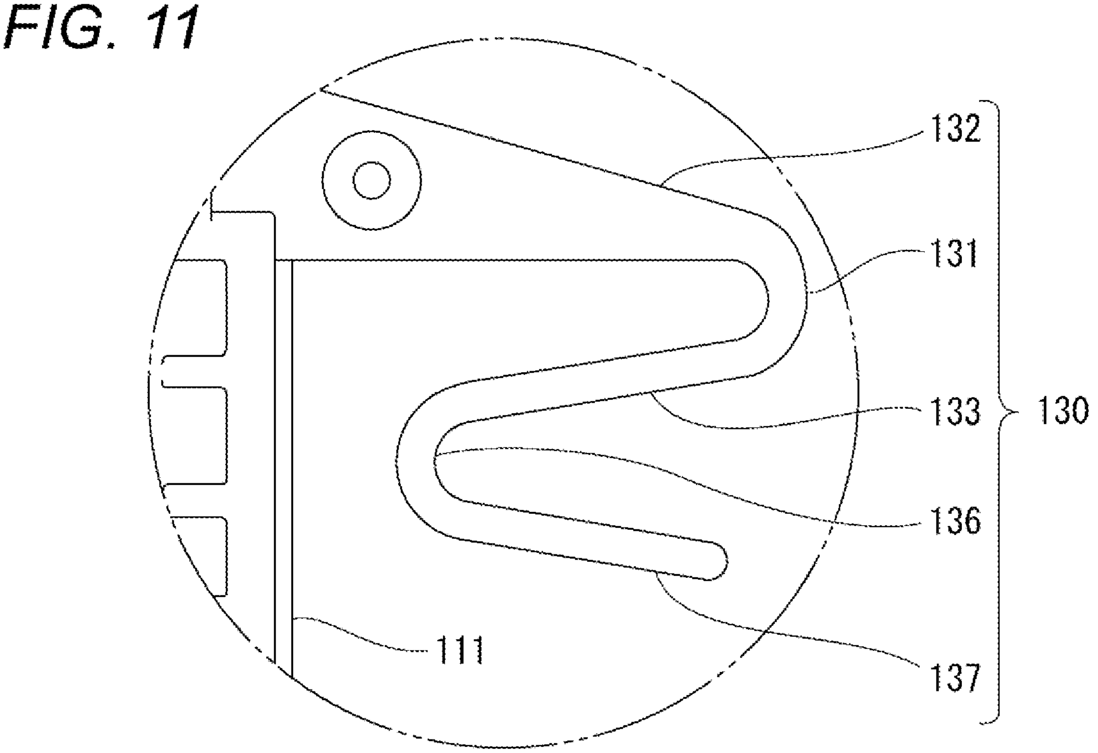
FIG. 11 is a partially enlarged view of a spring portion of the modification of the hinge.

In each of the first hinge 100A, the second hinge 100B, and the third hinge 100C of the present embodiment, the spring portion 130 has one bent portion 131. However, the number of bent portions 131 is not limited to one. The spring portion 130 may have a plurality of bent portions. FIG. 11 is a partially enlarged view of a modification of the first hinge 100A. FIG. 11 mainly illustrates the spring portion 130. As illustrated in FIG. 11, the spring portion 130 may include, in addition to the bent portion 131, the first spring portion 132, and the second spring portion 133, a second bent portion 136, and a third spring portion 137 formed to be separated from the front surface 111 from the second spring portion 133 via the second bent portion 136. The spring portion 130 may have three or more bent portions.

In the first hinge 100A, the second hinge 100B, and the third hinge 100C of the present embodiment, the operation portion 140 is a knob having the operation surface 141. However, the shape of the operation portion 140 is not limited to the knob. The operation portion 140 may have, for example, a pin shape protruding from the rear surface 112. The operation portion 140 may have a recessed portion or a hole formed in the rear surface 112 instead of the knob or the pin shape.

Figure 12:
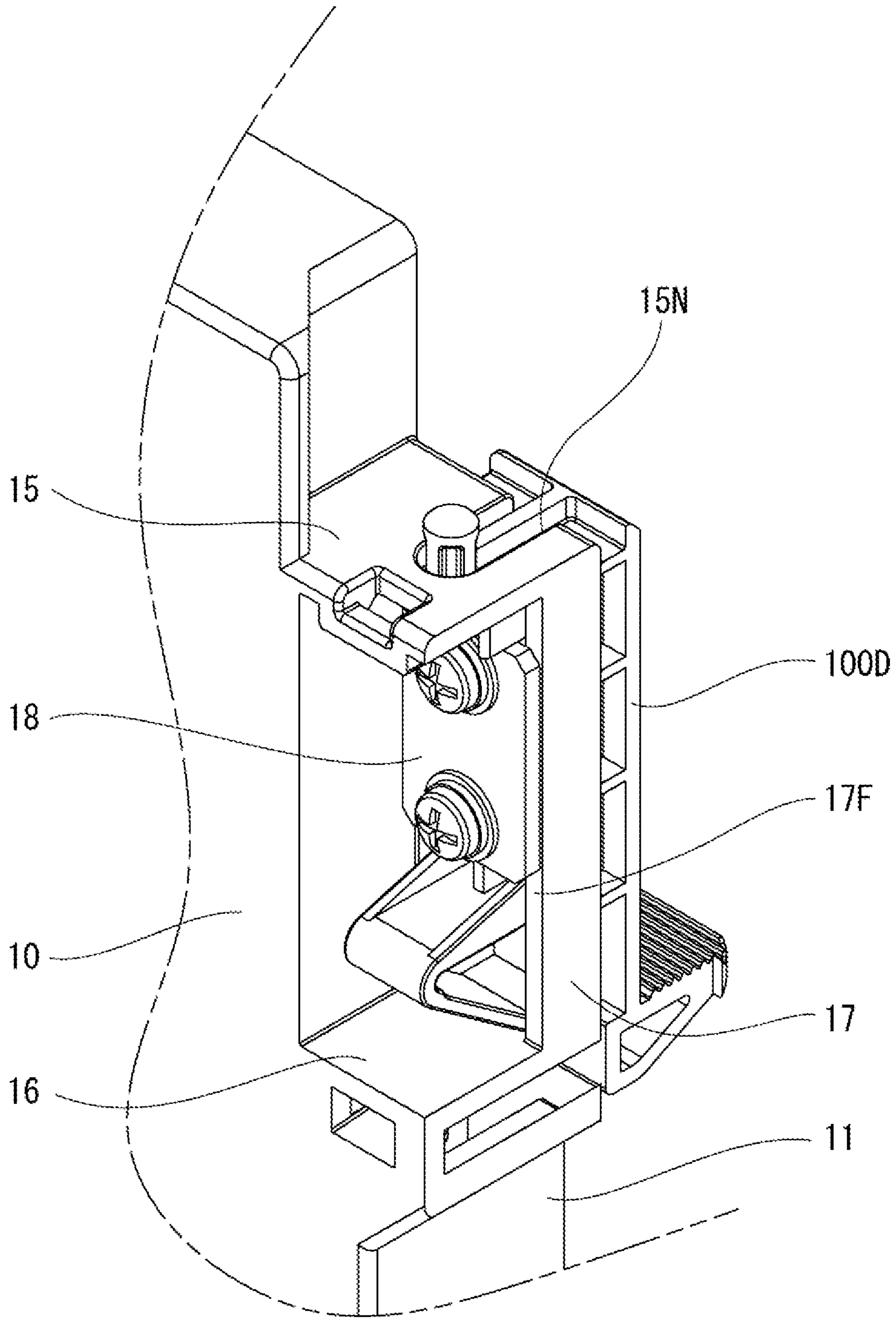
FIG. 12 is a perspective view illustrating a state in which the modification of the hinge is engaged with the door.

The first hinge 100A, the second hinge 100B, and the third hinge 100C of the present embodiment are engaged with the door 10 via the claw portion 151 of the side plate portion 150. However, each hinge may be engaged with the door 10 via another member instead of the claw portion 151. FIG. 12 is a perspective view illustrating a state in which a fourth hinge 100D according to a modification is engaged with the door 10. As illustrated in FIG. 12, the fourth hinge 100D is engaged with the door 10 via a fixing plate 18. The fixing plate 18 has a plate shape extending in the up-down direction. The fixing plate 18 is screwed to the front surface 111 of the fourth hinge 100D and is provided to slide on a front portion 17F of the side surface 17 of the door 10. When the operation portion 140 is operated in the up-down direction, the fixing plate 18 screwed to the fourth hinge 100D slides on the front portion 17F of the side surface 17 together with the fourth hinge 100D, and the entire fourth hinge 100D slides in the up-down direction. In this way, the fourth hinge 100D is stably guided along the front portion 17F of the side surface 17 of the door 10 by the fixing plate 18. Further, the fixing plate 18 can prevent the fourth hinge 100D from falling off the door 10.

In the door 10 of the optical connection box 1 of the present embodiment, the two first hinges 100A are attached to the first side 11, and the two second hinges 100B are attached to the second side 12. However, the number of hinges and the positions of the hinges with respect to the door are not limited thereto. For example, one first hinge 100A may be attached to the upper portion of the first side 11, and the door 10 may be attached to the main body 20 when a pin protruding downward from the lower portion of the first side 11 is directly engaged with the main body 20 of the optical connection box 1 without using the hinge. For example, the first hinges 100A may be attached to the first side 11 and the second side 12, respectively, and the second hinge 100B may be attached to the first side 11 and the second side 12, respectively. All the hinges attached to the door 10 may be the first hinges 100A or the second hinges 100B. When all the hinges attached to the door 10 are the first hinges 100A, the door 10 can be opened and closed from any one of the left and right directions with respect to the main body 20. The operation portion 140 of the first hinge 100A provided on the first side 11 may be provided to protrude from the front surface 13 of the door 10. The operation portion 140 of the second hinge 100B provided on the second side 12 may be provided to protrude from the rear surface 14 of the door 10.

Although each hinge of the present embodiment is attached to the door 10 of the optical connection box 1 of the optical cable, the engaged object of each hinge is not limited to the door 10 of the optical connection box 1 of the optical cables. Each of the hinges may be attached to a panel that is attachable to and detachable from any housing. For example, each hinge may be attached to a termination panel in which a plurality of connectors are disposed, and the termination panel may be easily attached to and detached from a termination box.

The invention claimed is:

1. A hinge comprising:

a base portion extending in a first direction;

a protruding portion extending from the base portion in a second direction crossing the first direction and having a projection projecting in the first direction;

a spring portion configured to be elastically deformed in the first direction; and an operation portion extending from the base portion in a third direction opposite to the second direction, wherein the base portion, the protruding portion, the spring portion, and the operation portion are made of a resin and integrally formed.

2. The hinge according to claim 1, further comprising:

a side plate portion protruding from the base portion and extending in the first direction between the protruding portion and the spring portion.

3. The hinge according to claim 1, wherein the spring portion includes a first spring portion protruding from the base portion, a second spring portion formed from the first spring portion toward the base portion via a bent portion, and a first rib connecting the first spring portion to the second spring portion at the bent portion.

4. The hinge according to claim 1, wherein the projection has a pin shape.

5. The hinge according to claim 1, wherein the projection is a latch.

6. A door of an optical connection box of an optical cable, the door comprising:

the hinge according to claim 1, wherein the spring portion is configured to urge the hinge in the first direction with respect to the door, and the projection is attached to and detached from the door by moving the operation portion in the first direction.

7. The door according to claim 6, wherein the spring portion has an abutment rib protruding from a bent portion in the first direction, the abutment rib is configured to abut on a part of the door when the hinge slides with respect to the door, and a distance between (i) the abutment rib in a state in which the hinge has not been slid with respect to the door and (ii) the part of the door is 0.4 times or more and 0.6 times or less of a maximum slide stroke length of the hinge sliding with respect to the door in the first direction.

8. A door of an optical connection box of an optical cable, wherein the door has a first side and a second side opposite each other, the door comprising:

at least one first hinge provided on the first side, each first hinge comprising:

a first base portion extending in a first direction;

a first protruding portion having a pin-shaped projection projecting in the first direction;

a first spring portion configured to be elastically deformed in the first direction; and a first operation portion, wherein the first base portion, the first protruding portion, the first spring portion, and the first operation portion are made of a resin and integrally formed;

the first spring portion of each first hinge being configured to urge the first hinge in the first direction with respect to the door on the first side, and the pin-shaped projection of each first hinge being attached to and detached from the door by moving the first operation portion of the first hinge in the first direction on the first side, and at least one second hinge provided on the second side, each second hinge comprising:

a second base portion extending in the first direction;

a second protruding portion having a latch projecting in the first direction;

a second spring portion configured to be elastically deformed in the first direction; and a second operation portion, wherein the second base portion, the second protruding portion, the second spring portion, and the second operation portion are made of a resin and integrally formed, the second spring portion of each second hinge is configured to urge the second hinge in the first direction with respect to the door on the second side, the latch of each second hinge is attached to and detached from the door by moving the second operation portion of the second hinge in the first direction on the second side, the first operation portion of each first hinge protrudes from a first surface of the door, and the second operation portion of each second hinge protrudes from a second surface of the door.

9. The door according to claim 8, wherein the at least one of first and second spring portions has an abutment rib protruding from a bent portion in the first direction, each abutment rib is configured to abut on a respective part of the door when the hinge slides with respect to the door, and a distance between (i) the abutment rib in a state in which the hinge has not been slid with respect to the door and (ii) the respective part of the door is 0.4 times or more and 0.6 times or less of a maximum slide stroke length of the hinge sliding with respect to the door in the first direction.

10. A door of an optical connection box of an optical cable, the door comprising:

a hinge, comprising:

a base portion extending in a first direction;

a protruding portion having a projection projecting in the first direction;

a spring portion configured to be elastically deformed in the first direction; and an operation portion, wherein the base portion, the protruding portion, the spring portion, and the operation portion are made of a resin and integrally formed, the spring portion is configured to urge the hinge in the first direction with respect to the door, and the projection is attached to and detached from the door by moving the operation portion in the first direction.

11. The door according to claim 10, wherein the spring portion has an abutment rib protruding from a bent portion in the first direction, the abutment rib is configured to abut on a part of the door when the hinge slides with respect to the door, and a distance between (i) the abutment rib in a state in which the hinge has not been slid with respect to the door and (ii) the part of the door is 0.4 times or more and 0.6 times or less of a maximum slide stroke length of the hinge sliding with respect to the door in the first direction.

* * * * *